United States Patent [19]

Bening et al.

[11] Patent Number: 5,136,752
[45] Date of Patent: Aug. 11, 1992

[54] HINGE AND LATCH STRUCTURE FOR VEHICLE HOOD

[75] Inventors: Curtis R. Bening, Burnett; Dean J. Tessenske, Horizon, both of Wis.

[73] Assignee: Deere & Company, Moline, Ill.

[21] Appl. No.: 721,059

[22] Filed: Jun. 26, 1991

[51] Int. Cl.⁵ .............................................. B62D 25/10
[52] U.S. Cl. ...................................... 16/287; 16/291; 16/294; 180/69.21
[58] Field of Search .......................... 16/287, 291, 294; 180/69.21

[56] References Cited

U.S. PATENT DOCUMENTS 3,004,282 10/1961 MacCallum ........................... 16/294
3,767,001 10/1973 Chupick ................................ 16/291
4,125,170 11/1978 Botz ...................................... 16/287

Primary Examiner—Robert L. Spruill
Assistant Examiner—Carmine Cuda

[57] ABSTRACT

A hinge-latch structure is provided for the hood of a lawn and garden vehicle. The hinge structure includes dual pivots at the forward end of the hood to move the hood forwardly, upwardly and then swing it above a lateral axis to provide access to the engine compartment. An over-center spring mechanism serves to assist the operator in opening or closing the hood and further serves as a latch to urge the hood towards its closed position. A sliding seat latch is carried between the rear of the vehicle and the hood to guide the hood into place and prevent contact with control levers carried about the rear of the hood seating area.

6 Claims, 4 Drawing Sheets

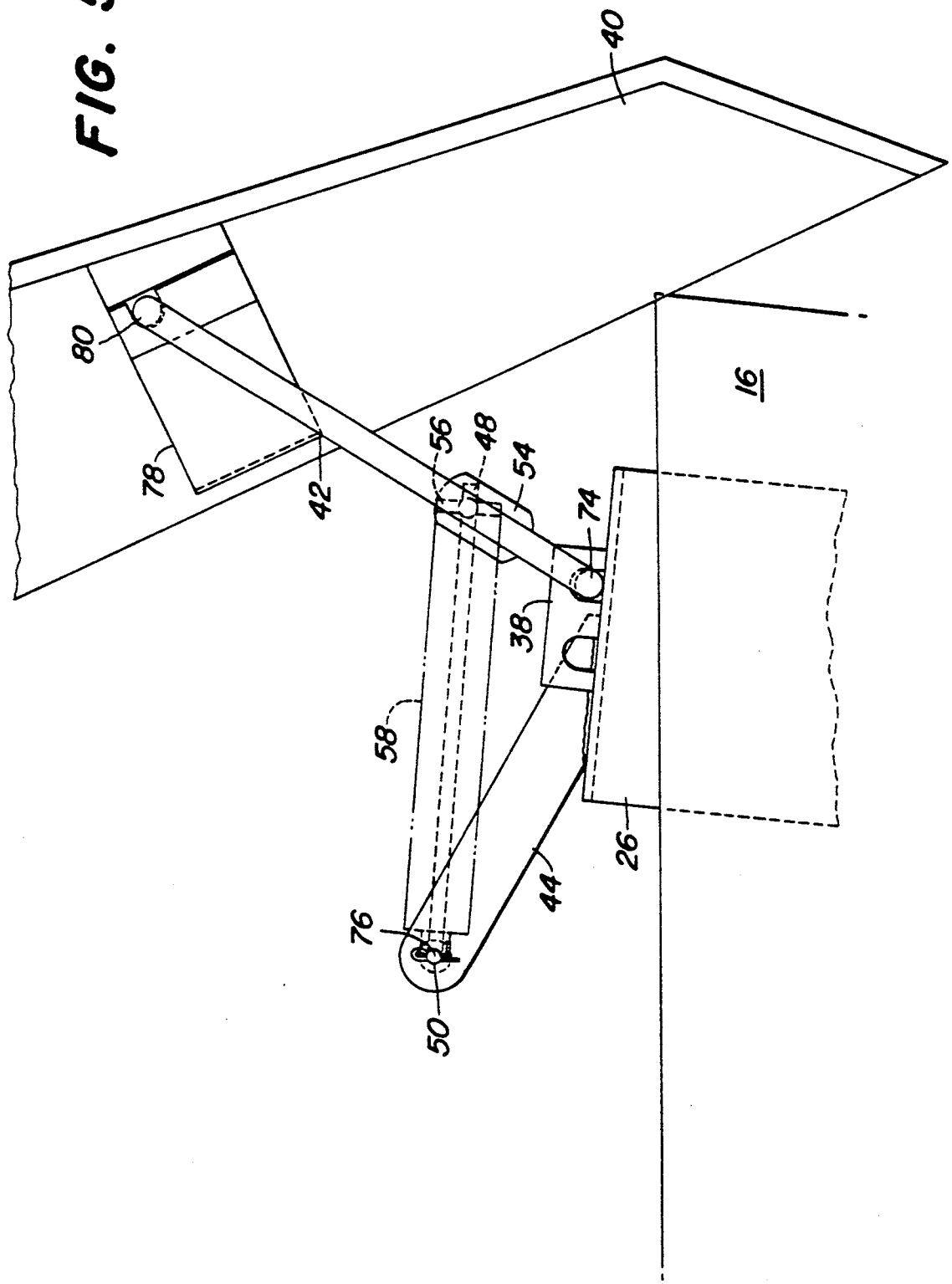

HINGE AND LATCH STRUCTURE FOR VEHICLE HOOD

BACKGROUND OF THE INVENTION

1. Field of the Invention

The present invention relates to hinge structures for hoods of vehicles and more particularly to a hinge and latch structure for the hood of a lawn and garden vehicle.

2. Description of the Related Art

Small vehicles, such as lawn and garden tractors, typically have hoods which cover the top portion of the vehicle and extend from the operator's station to the front or rear portion of the vehicle, depending on where the operator is seated.

Underneath the hood is carried the engine and other vehicle components which require routine and/or periodic attention. Access to these components is generally provided through raising and/or removing the hood. Removal and replacement can require specialized tools and/or significant time, neither of which is desirable.

It is common to equip such hoods with hinge structures that enable them to pivot about their forward or rearward ends to provide such access. It is further known to provide hinge structures which allow the hood to pivot upwardly about one end and then shift forward towards that end to provide enhanced access to the engine and its components.

These hinge structures typically consist of four bar linkages which permit pivotal and then shifting movement of the hood. Generally provided for use with these hinges are separately activated latch mechanisms for securing the hood in its closed position on the vehicle body.

SUMMARY OF THE INVENTION

Accordingly, it would be desirable to provide a hinge structure for a hood of a small vehicle, such as a lawn and garden tractor which would permit quick and easy access to the engine and other components carried under the hood.

It would also be desirable to provide a hinge structure that allows the hood to be raised and then shifts it away from the engine compartment to enhance such access.

It would also be desirable to provide a hinge structure with means for retaining the hood on the vehicle rather than requiring that it be removed when access is desired.

It would also be preferable to provide a hinge structure that includes biasing means for assisting the operator in raising and/or lowering the hood with the biasing means further serving to alternately urge the hood towards its closed or open position.

It would also be desirable to provide a hinge structure with stops to limit its range of motion and thereby minimize damage that may occur as the hood is opened.

Further, it would be desirable to provide the non-hinged end of the hood with self-aligning guides and locking means to assure that it is properly seated and latched as it is closed.

It would also be desirable to provide a hinge structure which is adapted to first shift the hood horizontally to allow one end to lift and clear the steering wheel and associated controls which may be located above that end of the hood.

It would also be desirable to provide such a hinge structure from a minimum number of parts, so as to reduce associated manufacturing, assembly and maintenance expenses.

Toward this end there is provided a hinge structure composed of five separate parts which cooperates with a latch structure so that when the hood is opened it first shifts horizontally to clear the end of the hood from beneath the steering controls and then rotates the hood upwardly and forwardly to provide clear access to the engine and its components. This structure includes means biasing the hinge towards its closed configuration to assist the operator in closing the hood and also serve as a latch structure to maintain the hood in its latched position. The biasing means further serves to assist the operator in opening the hood as it urges the hood towards its open position through the use of an over-center mechanism coupled with the hinge structure.

BRIEF DESCRIPTION OF THE DRAWINGS

FIG. 5 is another enlarged side schematic view of the hood and hinge structure illustrating the hood in its forwardly shifted and opened position.

DESCRIPTION OF THE PREFERRED EMBODIMENT

Figure 1:
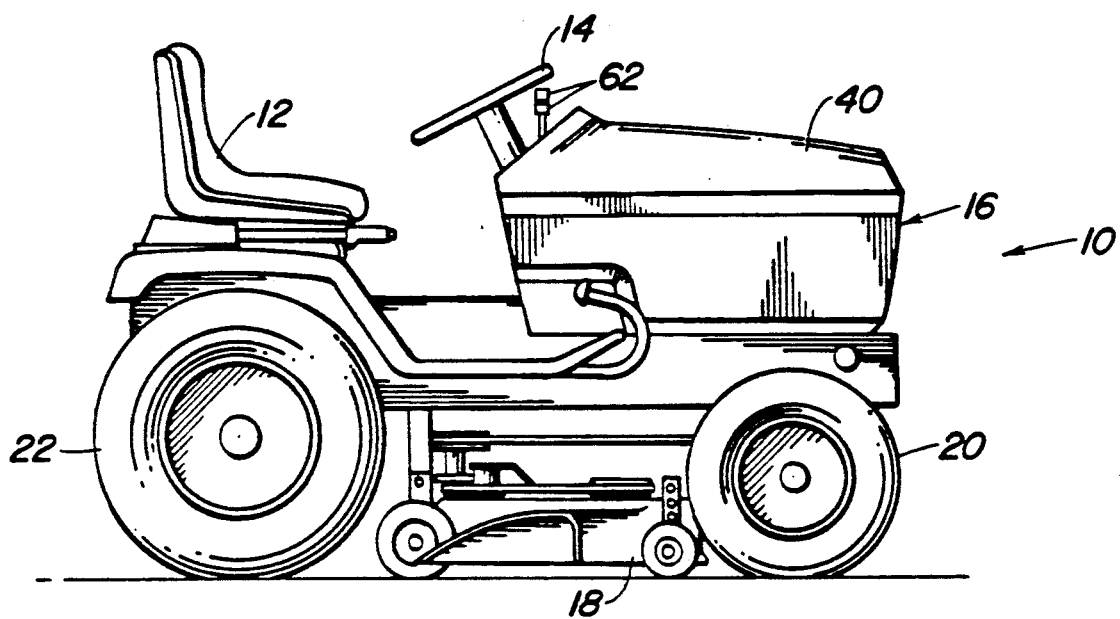
FIG. 1 illustrates a lawn and garden tractor capable of utilizing the present invention.

Looking first to FIG. 1, there is illustrated a lawn and garden vehicle 10 of the type which would be capable of utilizing the present hinge structure and latch mechanism. The vehicle 10 would be a rear mounted lawn and garden tractor with a front mounted engine and would include a seat 12 carried at the rear thereof for the operator. A steering wheel 14 for controlling the direction of the vehicle 10 is carried in front of the seat 12. The engine is not shown but would be carried within the body or compartment 16 at the front of the vehicle 10. A rotary mower 18 is carried beneath the vehicle 10 between the front and rear wheels 20 and 22.

Figure 2:
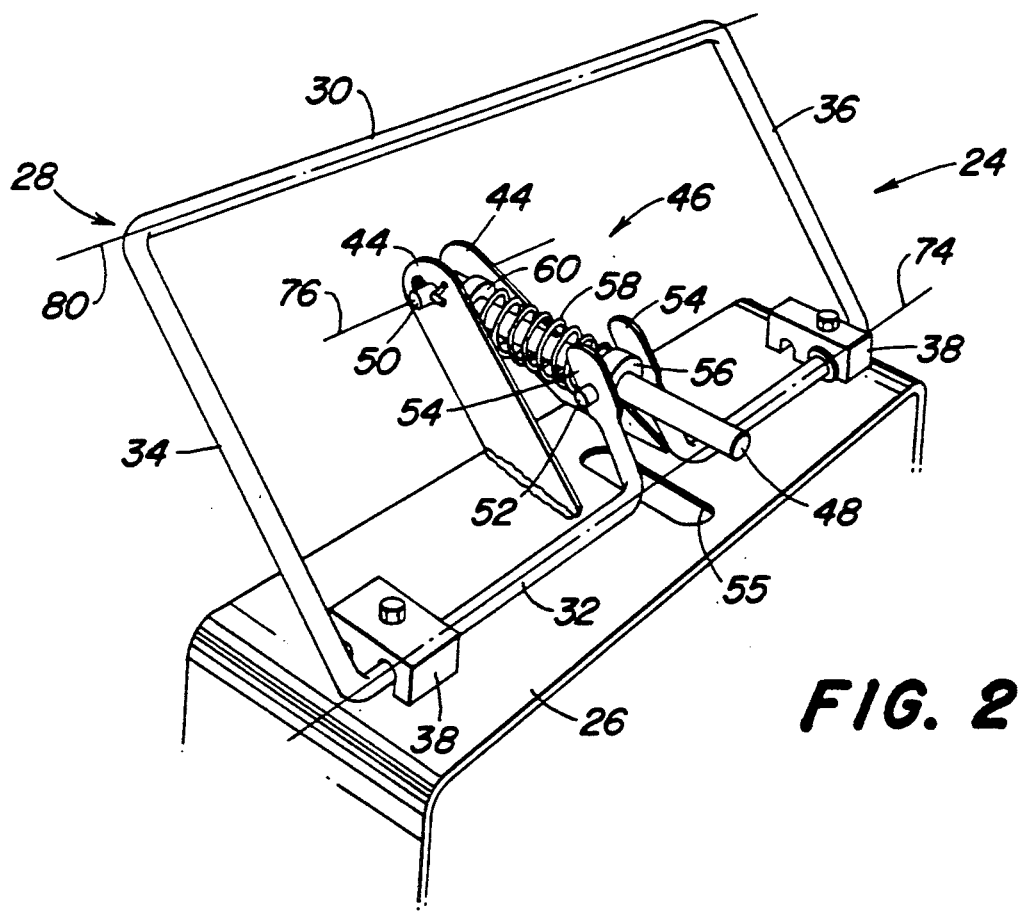
FIG. 2 illustrates an elevated perspective of the hinge structure which would be utilized at one end of the hood member.

Looking now to FIG. 2, there is illustrated the hinge structure 24 utilized in the preferred embodiment of the invention, this hinge structure 24 being mounted as illustrated in FIG. 5 on a hood support 26 which is in turn secured by conventional means to the body 16 of the vehicle 10.

The hinge structure 24 includes a hinge rod 28 taking the form of a generally rectangular member having a set of parallel spaced apart upper and lower legs 30 and 32 and parallel spaced apart near and far legs 34 and 36. This hinge rod or structure 28 is carried in pivot supports 38 which are mounted to the hood support 26. The pivot supports or blocks 38 have holes or openings passing therethrough and are bolted or attached through similar conventional means to the hood support 26. The pivot blocks 38 permit swinging fore-and-aft movement of the hinge rod 28 between the positions illustrated in FIGS. 4 and 5.

The top horizontal leg 30 of the hinge rod would be mounted to the hood 50 through use of a sheet metal clip, pivot block or other similar manner. Similarly, the hood 40 would be able to swingably pivot about this connection with leg 30 as constrained by the over-center mechanism 46 and stop 42 carried by the hood 40.

Looking again to FIGS. 2 and 5, there is illustrated a support member including arms 44 also connected to the hood support 26. The pair of spaced apart support arms 44 carry the over-center mechanism 46 which includes a guide rod 48. The rod 48 is carried in pin supports 50 and 52. The rear pin support 50 is carried by the support arms 44 while the front of the rod 48 is carried by upstanding brackets 54 formed in the ends of the rod which comprises the lower leg 32 of the hinge rod 28. A swivel 56 is carried between the ends of the brackets 54 for permitting swinging movement of the guide rod 48 relative to the brackets 54. The slot 55 is provided in the hood support 26 to allow such swinging movement of the rod 48 therethrough. A spring 58 is carried between a rear stop 60 mounted on the rod 48 and the forward stop as provided by the swivel 56. The spring 58 is mounted under compression to urge the hinge rod 48 either towards its forwardly oriented position as illustrated in FIG. 5 or towards its rearwardly oriented position illustrated in FIG. 3.

Looking now to FIG. 4, it is seen that the rear of the hood is nestled below the steering wheel 14 and control levers 62. The hood 40 is releasably latched to the body 16 in this area by structures, one provided on each side of the vehicle body 16 and hood 40. These latch structures include a plate 64 having a sliding track 66 which is inclined downwardly and rearwardly as viewed in FIG. 4 with a hook member 68 projecting forwardly and a slot opening 70 beneath the hook member 68 for receiving a pin 72 carried on the rear portion of the hood 40.

Figure 3:
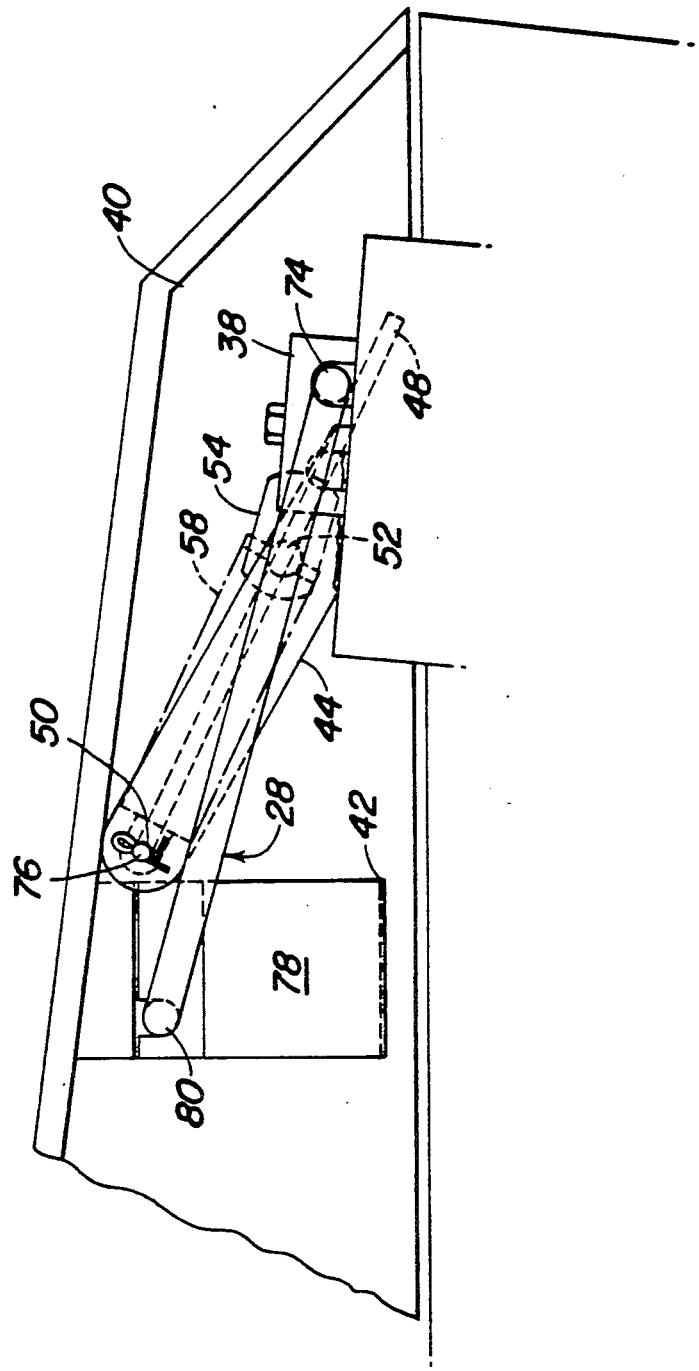
FIG. 3 is an enlarged and partial side view of the hood with the hinge structure illustrated in its closed position where the over-center mechanism urges the hood toward its closed position.

Looking now to the illustrations of FIGS. 2, 3 and 5, it will be seen that the over-center guide rod 48 and compression spring 58 operate between the generally horizontal pivot axes 74 and 76 which pass through the lower leg 32 of the hinge rod 28 and the pin 50 carried between the pivot supports 44. When the hood 40 is closed, as illustrated in FIG. 3, the front end of the guide rod 48 passes beneath the horizontal axis 74 through the leg 32 of the hinge rod 28 and the compression spring 58 therefore serves to urge the front of the hood 40 downwardly toward engagement with the body 16 of the vehicle 10.

When the hood 40 is opened, as illustrated in FIG. 5, the guide rod 48 has moved above the pivot axis 74 through the leg 32 of the hinge rod 28 and the compression force exerted by the spring 58 urges the hinge rod 48 forwardly. As the spring force acts through the moment arm comprised of the distance between the axis 74 and the connection between the guide rod 48 and the hinge rod 28, the hinge rod 28 and the hood 40 are urged forwardly about the pivot axis 74.

Figure 4:
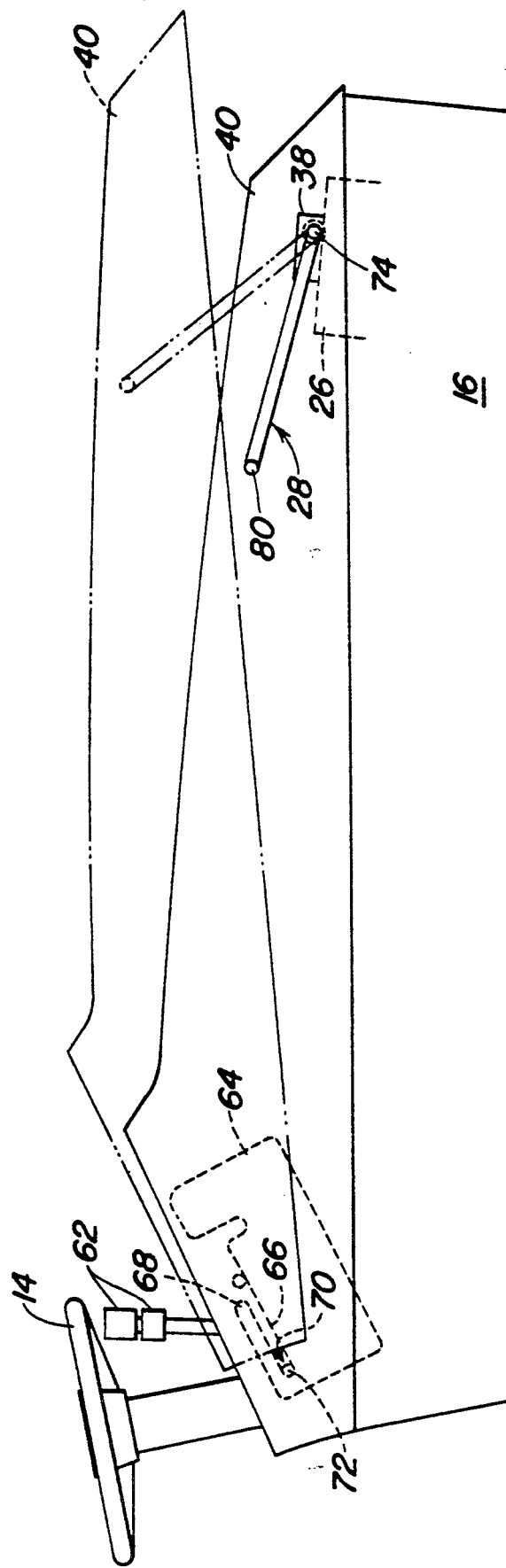
FIG. 4 is an enlarged side schematic of the hood hinge and latch structures illustrating the hood in solid lines in its latched position and in phantom lines as it is shifted from its latched position to an opened position.

In operation, the hood 40 would be in its closed configuration as illustrated in FIG. 3 and by the solid lines in FIG. 4. To release the hood 40 and swing it upwardly and out of the way for access to the engine and its components, the operator would first move to the front of the vehicle 10 and raise the front of the hood 40 a few inches as illustrated by the phantom lines in FIG. 4. This movement would, in effect, shift the over-center rod 48 from the position illustrated in FIG. 3 to a position on the other side of the axis 74 through the leg 32 of the hinge rod 28 as is shown generally in FIG. 5. Simultaneously, the compression spring 58 would serve to urge the hinge rod 28 forwardly to assist the operator in shifting the hood forwardly and in lifting the hood 40.

As the hood 40 is shifted forwardly, the pins 72 seated in the slot 70 of the latch plate 64 would slide along the track 66 and the hood 40 would come out from under the control levers 62 and steering wheel 14. Subsequently, the operator would move the hood 40 forwardly and the hinge rod 28 would rotate about the axis 74 through its bottom leg 32 to rotate the hood 40 forwardly. Concurrently, the hood 40 would swing about its pivotal connection through the upper leg 30 of the hinge rod 28 to allow the hood 40 to also shift in a clockwise arc about that pivotal axis to shift the hood 40 to the configuration generally illustrated in FIG. 5. A stop 42 in the form of an ear or leg carried on the bracket 78 is mounted adjacent to the hinge rod connection with the hood 40 and serves to limit rotation of the hood 40 relative to the upper pivotal connection between the leg 80 and hood 40.

With the hood 40 opened in this fashion and swung forwardly, substantial access is provided to the engine compartment and its components.

In returning the hood 40 to its mated configuration with the body 16, the operator would simply reverse the steps and swing the hood 40 from the position illustrated in FIG. 5 about the upper pivotal axis downwardly and onto the body 16, wherein the pins 72 would seat on the track 66 of the slide plate 64. As the hood 40 swings about its pivot connection with leg 80, the rear of the hood 40 shifts downwardly and inwardly to clear the control levers 62 and to seat the pins 72 in the slot 66 underneath the hook 68. Then, the operator would depress the front end of the hood 40 to cause the over-center mechanism 46 to pass to the position illustrated in FIG. 3 where it would urge the front of the hood 40 downwardly and inwardly toward the body 16, thereby serving as a latch to hold the forward end of the hood in place.

With the present invention there is provided a hinge structure, rear latch mechanism and a latch function to the hinge structure requiring only a few parts and no tools and/or other release mechanisms when the operator wants to raise and/or lower the hood.

The few number of parts assist in reducing the manufacturing, assembly and/or maintenance expenses associated with the hinge and latch mechanism and thereby should enhance the reliability of the structure in performing its functions.

We claim:

1. Hinge structure usable with an elongated hood member carried on the body of a vehicle, comprising:
   first pivot means carried near the front of the body;
   second pivot means carried near the front of the hood member;
   a support member carried by the body and fore-and-aft spaced from the first pivot means;
   link means extending between and swingably secured to the first and second pivot means;
   over-center spring means extending between and connected to the link means and the support member, said over-center means including guide rod means carried between the link means and support member with a compression spring operatively carried by the guide rod means, the spring means being movable between first and second positions, and when in its first position, yieldably urging the link means towards the support member and when its second position yieldably urging the link means away from the support member; and stop means operative between the hood member and the link means to restrict swinging movement of the hood member about the second pivot means.

2. The invention defined in claim 1 wherein the link means includes a rod member with spaced apart generally parallel first and second legs, said legs being swingably carried in the first and second pivot means.

3. The invention defined in claim 2 wherein the stop means includes an arm member carried by the hood member which is engagable with the rod member to limit swinging movement of the hood member relative to the rod member.

4. The invention defined in claim 1 wherein latch means is further provided between the hood member and the body for releasably securing the hood member to the body.

5. Hinge structure usable with a hood member carried on the body of a vehicle, comprising:

first and second pivot means carried by the body and hood member;

link means extending between and pivotally secured to the first and second pivot means;

a support member carried by the vehicle, spaced from the first pivot means;

over-center means extending between and connected to the support member and the link means, said over-center means including guide rod means carried between the link means and support member with a compression spring operatively carried by the guide rod means, the over-center means being movable between first and second positions to yieldably urge the link means away from the support member when in its first position and towards the support member when in its second position;

stop means adjacent one pivot means for limiting pivotal movement of the link means with respect to that pivot means; and latch means between the hood member and body, spaced from the hinge structure, for releasably securing the hood member to the body.

6. Hinge structure usable with an elongated hood member carried on the body of a vehicle, comprising:

first pivot means carried near the front of the body;

second pivot means carried near the front of the hood member;

a support member carried by the body and fore-and-aft spaced from the first pivot means;

link means extending between and swingably secured to the first and second pivot means;

over-center spring means extending between and connected to the link means and the support member, said spring means being movable between first and second positions, and when in its first position, yieldably urging the link means towards the support member and when its second position yieldably urging the link means away from the support member;

stop means operative between the hood member and the link means to restrict swinging movement of the hood member about the second pivot means; and latch means between the hood member and the body for releasably securing the hood member to the body, the latch means including a latch plate carried by the body fore-and-aft spaced from the hood structure with the plate having a track adapted to slidably receive a pin means carried by the hood member for guiding the pin means into or out of a latch slot carried in the plate.

* * * * *